United States Patent [19]
Wang

[11] 3,855,332
[45] Dec. 17, 1974

[54] PROCESS FOR PRODUCTION OF POLYARYLENES

[75] Inventor: Chen-Shen Wang, Naperville, Ill.

[73] Assignee: Standard Oil Company, Chicago, Ill.

[22] Filed: Dec. 12, 1972

[21] Appl. No.: 314,424

Related U.S. Application Data

[63] Continuation-in-part of Ser. No. 169,367, Aug. 5, 1971, abandoned.

[52] U.S. Cl............... 260/670, 260/2 H, 260/668 R
[51] Int. Cl............................................ C07c 15/12
[58] Field of Search................ 260/2 H, 668 R, 670

[56] References Cited
UNITED STATES PATENTS

| | | | |
|---|---|---|---|
| 3,437,695 | 4/1969 | Kruse.................................. | 260/2 H |
| 3,729,433 | 4/1973 | Billow et al.......................... | 260/2 H |
| 3,734,866 | 5/1973 | Aylies et al......................... | 260/2 H |

*Primary Examiner*—Curtis R. Davis
*Attorney, Agent, or Firm*—Ralph C. Medhurst; Arthur G. Gilkes; William T. McClain

[57] ABSTRACT

Polyarylenes, polymers of aromatic hydrocarbons, are obtained by the coupling of aromatic hydrocarbons over a high surface area active carbon.

12 Claims, 1 Drawing Figure

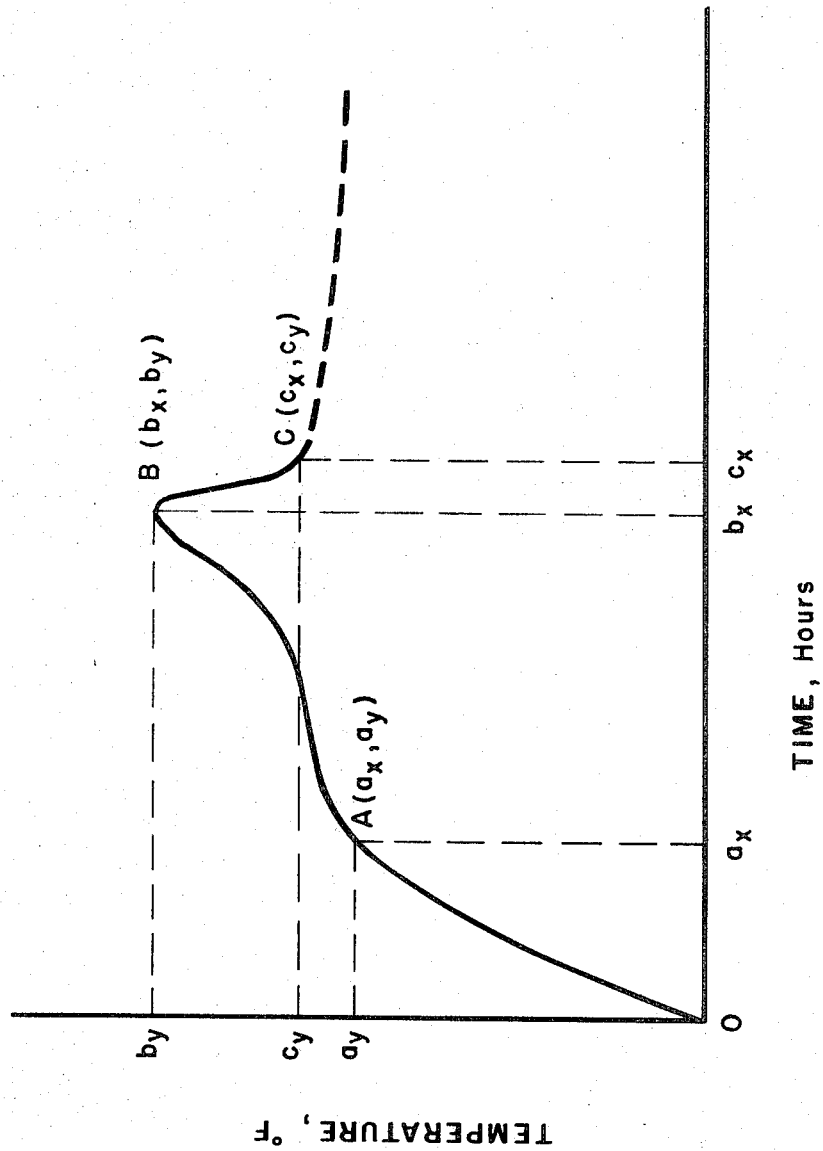

PROCESS FOR PRODUCTION OF POLYARYLENES

CROSS-REFERENCE

This application is a continuation-in-part of Ser. No. 169,367, filed Aug. 5, 1971 and now abandoned on behalf of the same inventor.

INTRODUCTION

Over the past decade there has been a growing need for high temperature stable polymers. The high degree of thermal stability associated with the arylene bond in polyarylenes has been known for some time. The linear polyarylenes produced to date have generally been of little utility due to their relative insolubility and infusibility. Wennerberg has disclosed a process for making polyarylenes which are relatively soluble, fusible, and thermally stable in his co-pending application, Ser. No. 264,846, filed June 21, 1972 as a continuation-in-part of Ser. No. 858,867, filed Sept. 17, 1969 now abandoned. These branched polyphenylenes are particularly useful in high temperature applications such as carbon fiber composites and ablative materials.

Low molecular weight polyarylenes are useful in the preparation of ablative materials and in the preparation of phosphonylated polyarylenes. These phosphonylated polyarylenes were disclosed in my copending application, Ser. No. 169,430, filed Aug. 5, 1971 and now abandoned. These phosphonylated polyarylenes are useful as flame retardants for cellular polymers and thermoplastics.

SUMMARY OF THE INVENTION

This invention relates to an improved process for making fusible, soluble, and thermally stable branched polyarylenes of low molecular weight. This improved process comprises the treating of aromatic hydrocarbons with high surface area active carbons whose surface area is at least about 1500 $m^2/g$, in the presence of hydrogen at elevated temperatures and pressures. In general, the temperature should be at least about 800°F and the pressure should be at least about 600 psig.

The inherent viscosity of the polymer produced by this process is generally between about 0.025 and 0.065 as determined in trichlorobenzene at 135°C. This roughly corresponds to a number average molecular weight range of about 1000 to 3000.

DESCRIPTION OF THE INVENTION

FIG. 1 is a plot generally showing the temperature-time characteristics of the reaction taking place in the process of this invention.

This invention is directed to an improved process for making branched polyarylenes having a low inherent viscosity. By low inherent viscosity, I mean an inherent viscosity not greater than about 0.065 when measured in trichlorobenzene at 135°C at a concentration of 0.02 g/ml. Preferably, the inherent viscosity is between about 0.025 and 0.045. This preferred range roughly corresponds to a number average molecular weight range of about 1000 to about 2000.

The process of this invention involves the contacting of aromatic hydrocarbons with a high surface area active carbon catalyst system in the presence of hydrogen at a temperature of at least about 800°F and at elevated pressures. In general, the pressures should be at least about 600 psig. The hydrogen partial pressure should be at least about 10% of the total pressure at reaction conditions. The surface area of the active carbon catalyst is at least about 1500 $m^2/g$.

These polyarylenes are readily prepared by a one-step process starting with partially hydrogenated aromatic hydrocarbons, by a two-step process starting with non-hydrogenated aromatic hydrocarbons or a mixture of non-hydrogenated aromatic and partially hydrogenated aromatic hydrocarbons, or by a combination of these processes. The one-step process consists of the catalytic dehydrogenative coupling of the partially hydrogenated aromatic hydrocarbons in the presence of hydrogen at elevated temperatures and pressures. The two-step process consists of a controlled partial hydrogenation as well as the dehydrogenative coupling. The two-step process begins with either non-hydrogenated aromatic hydrocarbons or a mixture of non-hydrogenated aromatic hydrocarbons and partially hydrogenated aromatic hydrocarbons. Preferably, a mixture of non-hydrogenated aromatics with from about 1% to 10% of partially hydrogenated aromatics is employed. This two-step process of controlled hydrogenation and dehydrogenative coupling can be run as two separate steps or is preferably combined into one process during which the controlled hydrogenation and the dehydrogenative coupling can be occurring simultaneously.

The polyarylenes produced by the process of this invention are compositions whch retain a high degree of thermal stability while possessing solubility in various aromatic solvents. The polyarylenes can be dissolved to different extents, depending on their molecular weight and structure, in solvents such as benzene, naphthalene, bromobenzene, and chlorobenzene. The halogenated aromatics are the preferred solvents.

The polymers produced by this invention are particularly useful in applications requiring high-temperature resistance. Among the applications for this polymer are use in carbon fiber composites, in ablative materials, and in the preparation of phosphonylated polyarylenes.

The high surface area active carbon used in this invention has a surface area of at least about 1500 $m^2/g$. Preferably, the surface area is between 2000 $m^2/g$ and 3500 $m^2/g$.

The active carbon catalyst can also have other active ingredients incorporated into it. Preferably, the active carbon catalyst is base treated. The base treatment of the carbon catalyst involves contacting the active carbon catalyst with a base material prior to its use in the process of this invention. Typical bases which may be used are KOH, NaOH, $Ca(OH)_2$, $Mg(OH)_2$ and the like. The preferred bases are NaOH and KOH.

If the carbon catalyst of this invention is base treated, it is usually saturated with the base material. Saturation is herein defined to mean a base loading of the carbon catalyst in the range of about 10% to about 15% by weight of the total catalyst weight. Saturation is achieved by mixing a properly concentrated volume of base solution with the carbon catalyst. The volume of base solution should be approximately equal to the pore volume of the carbon catalyst. After base treatment, the catalyst is heated at about 80°–100°C for 24–48 hours in order to remove the water from the catalyst and to ensure an even distribution of the base material.

If the carbon catalyst is supersaturated with base material so that the base content is greater than about 15% by weight, longer reaction times are required and polyarylenes of very low molecular weights are produced.

The amount of catalyst necessary to effectively be utilized in the process of this invention will vary with the reaction system being polymerized and the reaction conditions in terms of time, temperature and pressure. If an insufficient amount of catalyst is used for a particular reaction system under any set of reaction conditions, reaction rates will be decreased. If excess catalyst is used, conversion will usually be decreased and coke formation will occur. For most reaction systems, at least about 1% by weight catalyst, based on the monomer weight, is used and preferably about 2% to about 4% by weight.

The aromatic hydrocarbons which are polymerized in the process of this invention are defined to be any compound containing an aromatic ring structure which is either substituted or non-substituted. If it is substituted, the substituted aromatic compounds cannot have groups which are too large and preferably such compounds are mono-, di- and tri-substituted benzene ring compounds wherein the substituents are alkyl groups containing 1 to 3 carbon atoms.

Included within the class of aromatic hydrocarbons are partially hydrogenated aromatic hydrocarbons as distinguished from non-hydrogenated aromatic hydrocarbons which are also in the class. Such partially hydrogenated aromatic hydrocarbons must be hydrogenated to at least their dihydro derivative but must not be fully hydrogenated. The non-hydrogenated aromatic and the partially hydrogenated aromatic hydrocarbons may be reacted alone or in combination. Preferably, the non-hydrogenated aromatic hydrocarbons are reacted in the presence of at least about 1% to 10%, preferably about 2% to about 5%, by weight of the partially hydrogenated aromatics as based on their total combined weight.

Specific examples of non-hydrogenated aromatic hydrocarbons which can be polymerized by the process of this invention are compounds that have an aromatic ring structure such as phenyl, biphenyl, toluene, xylenes, ethylbenzene, naphthalene, mesitylene, anthracene and the like.

The partially hydrogenated aromatic hydrocarbons which can be utilized in the process of this invention are generally partially hydrogenated derivatives of the non-hydrogenated aromatic hydrocarbons listed above. Specific examples of partially hydrogenated aromatics are the hydrophenyls such as cyclohexadiene and cyclohexene, the hydrobiphenyls such as phenyl cyclohexadiene, phenyl cyclohexene, and phenyl cyclohexane, the hydrotoluenes, the hydroxylenes, the hydronaphthalenes, the hydroanthracenes, and the like.

All of the aromatic hydrocarbons which are polymerized in the process of this invention must have at least two unsubstituted positions for the coupling reactions.

The polymerization must be conducted in the presence of hydrogen. The hydrogen partial pressure should be at least about 10% of the total pressure at reaction conditions. Preferably the hydrogen partial pressure is from about 30 to 60% of the total reaction pressure at reaction conditions. More preferable, the partial hydrogen pressure is about half of the total pressure. In general, if the process of this invention is carried out in an autoclave reactor, the initial charge of hydrogen gas at room temperature should be at least about 50 psig and preferably between about 200 psig and 400 psig.

The presence of an inert solvent is not necessary. However, with some monomers it may be desirable to conduct the reaction in a hydrocarbon solvent which tends to remain relatively inert under the conditions of the reaction.

Specific time, pressure and temperature conditions for the process of this invention cannot be given since such will depend upon the nature of the particular aromatic hydrocarbon being polymerized. For example, condensed ring compounds such as naphthalene are in general more reactive than single ring compounds such as biphenyl and the reactions may be carried out under milder conditions with the former.

However, time and temperature conditions for a batch process beginning with non-hydrogenated aromatic hydrocarbons or a mixture of non-hydrogenated and partially-hydrogenated aromatic hydrocarbons can be taught generally by referring to reaction temperature — reaction time relationships for any particular reacting system being subjected to a constant heat input.

The polyarylenes produced by the process of this invention are believed to be produced by the dehydrogenative coupling of partially hydrogenated aromatic hydrocarbons. Therefore, if partially hydrogenated aromatic hydrocarbons are not initially used as monomer reactants, the coupling cannot effectively take place until the aromatic hydrocarbons are partially hydrogenated. Hydrogenation must produce at least dihydro derivatives but must not result in complete hydrogenation. The partial hydrogenation of the aromatic hydrocarbons in the process of this invention is exothermic; the dehydrogenative coupling of the partially hydrogenated aromatics is endothermic. Utilizing these characteristics under conditions of constant heat input to the reaction system, reaction times and temperatures may be generally identified.

In order to illustrate this point, reference is made to FIG. 1 where a general reaction temperature vs. reaction time curve is given for an aromatic hydrocarbon reaction system having a constant heat input and which is polymerized in accordance with the process of this invention. With the constant heat input, the reaction system is preheated for a period of time $a_x$ to a temperature $a_y$. This preheat period extends up to a point A on the curve. Point A is approximately on that portion of the curve where the slope changes from steep to gradual. After preheat, the reaction system begins to react in substantial proportions in terms of partial hydrogenation with some coupling up to the peak point B having corresponding time and temperature coordinates of $b_x$ and $b_y$. It is from this point that it is thought that the major dehydrogenative coupling occurs to form the polyarylene, although some partial hydrogenation is still most likely occurring. The dehydrogenative coupling is considered for all practical purposes completed at point C where the curve starts to level off. It is therefor at point C with corresponding time and temperature coordinates of $c_x$ and $c_y$ that the reaction is terminated by terminating heat input to the reaction and allowing the reaction system to go to room temperature. Therefore, relative to this general curve, reaction time is considered to be that interval of time between reaction termination and preheat completion or the quantity ($c_x$-$a_x$). Reaction temperatures are similarly those temperatures between the peak reaction temperature and preheat completion, i.e., between $b_y$ and $a_y$.

As previously stated, the reaction time and reaction temperature correlations for the process of this invention will vary from system to system. However, for a batch process beginning with non-hydrogenated aromatic hydrocarbons or a mixture of non-hydrogenated and partially-hydrogenated aromatic hydrocarbons, the heat-up period corresponding to $a_x$ hours on the plot of FIG. 1 will typically vary from about 0.5 to about 2 hours. Similarly, the heat-up temperatures corresponding to $a_y$ on the curve can be from about 800° to about 1000°F. The peak reaction temperatures, $b_y$, corresponding to point B can be about 900 to about 1300°F, preferably 1000°F to 1200°F. The reaction temperature, $c_y$, at which the reaction is terminated is about 800° to about 1000°F. Therefore, the overall reaction temperature interval of $b_y$ to $a_y$ can have reaction temperatures varying from about 800°F to about 1300°F. The reaction time, i.e., the period of time between $a_x$ and $c_x$ is from about 2 to about 9 hours.

The pressures reached after the initial heat up are generally within the range of 600 psig to 1200 psig, although higher pressures are possible. The maximum pressure is generally within the range of 1000 psig to 2000 psig, preferably 1200 psig to 1700 psig.

We have also ascertained advantageous reaction conditions for the one-step process beginning with partially hydrogenated aromatic hydrocarbons and for the two-step process beginning with non-hydrogenated aromatic hydrocarbons or a mixture of non-hydrogenated aromatic hydrocarbons and partially hydrogenated aromatic hydrocarbons.

In a one-step process starting with the partially hydrogenated aromatic hydrocarbons, temperatures within the range of 800°F to about 1300°F, preferably about 900°F to 1200°F, and pressures within the range of 600 psig to 2000 psig, preferably 1000 psig to 1700 psig, more preferably 1200 psig to 1600 psig, have been found useful.

In a two-step process starting with non-hydrogenated aromatic hydrocarbons or a mixture of non-hydrogenated and partially-hydrogenated aromatic hydrocarbons, we have found that temperatures within the range of 400°F to 1200°F, preferably 800°F to 1100°F, and pressures within the range of 500 psig to 2000 psig, preferably 800 psig to 1500 psig, are useful in the hydrogenation step. In the dehydrogenation step, we have found temperatures within the range of 800°F to 1300°F, preferably 900°F to 1200°F, and pressures within the range of 600 psig to 2000 psig, preferably 1000 psig to 1700 psig, to be particularly useful.

The following examples are provided to better illustrate the process of this invention.

EXAMPLE I

Into a stirred 300 ml autoclave there was charged 2.0 g of an active carbon catalyst having a surface area of about 3000 m²/g, 97.5 g of biphenyl, 2.5 g of phenyl cyclohexane, and 300 psig of hydrogen gas. Constant heat input conditions were applied. The initial reaction temperature, $a_y$ of FIG. 1, was about 900°F. The peak reaction temperature was 1095°F and the maximum reaction pressure was 1700 psig. The final reaction temperature was 940°F. The reaction time including heat-up was 7 hours. No coke was produced by the reaction.

After the polymerization was concluded, the total crude product was dissolved in trichlorobenzene. The conversion to polymer soluble in trichlorobenzene was 18.5%. The inherent viscosity of the soluble product was 0.03 when measured in trichlorobenzene at 135°C. This corresponds to a number average molecular weight of about 1200. See Table I.

TABLE I

| Ex. No. | Catalyst | Peak Reaction Temperature, °F | Maximum Reaction Pressure, psig | Final Reaction Temperature, °F | Time (incl. heat-up) hrs. | % Conversion to Soluble Polyarylene | Inherent Viscosity[b] | Approximate No. Average Molecular Weight |
|---|---|---|---|---|---|---|---|---|
| I | Active Carbon[a] | 1095 | 1700 | 940 | 7 | 18.5 | 0.03 | 1200 |
| II | 14% KOH on Active Carbon[a] | 1085 | 1450 | 975 | 7 | 26.9 | 0.03 | 1200 |
| III | 14% KOH on Active Carbon[a] | 1055 | 1245 | 985 | 7 | 24.0 | 0.03 | 1200 |
| IV | 2% MoO₃ on Active Carbon[a] | 1100+ | 1530 | 1095 | 4-⅓ | 18.0 | 0.07 | 3500 |

[a] Active carbon had a surface area of 3000 m²/g.
[b] Measured at 135°C in trichlorobenzene using a Cannon-Ubbelohde viscometer.

EXAMPLES II–IV

Examples II through IV were conducted in essentially the same manner as Example I. The active carbon catalyst was modified as indicated in Table I. The reaction conditions and results are also shown in Table I.

While this invention has been described in conjunction with certain specific embodiments, it is evident that many alternatives, modifications, and variations will be apparent to those skilled in the art. Accordingly, the appended claims are intended to embrace all modifications, alternatives, and variations that come within the spirit and scope of this invention.

What I claim is:

1. A process for the preparation of branched polyarylenes which comprises treating an aromatic hydrocarbon, a partially hydrogenated aromatic hydrocarbon, or a mixture of an aromatic hydrocarbon and a partially hydrogenated aromatic hydrocarbon with an active carbon whose surface area is at least about 1500 m²/g in the presence of hydrogen and at a temperature of at least 800°F.

2. The process of claim 1 wherein the temperature is between 800°F and 1300°F and the pressure is between 600 psig and 2000 psig.

3. The process of claim 2 wherein the surface area of the active carbon is between 2000 m²/g and 3500 m²/g.

4. The process of claim 2 wherein the active carbon catalyst is loaded with from about 10% to about 15% by weight of base material.

5. The process of claim 4 wherein the base material is selected from the group consisting of KOH, NaOH, Ca(OH)$_2$, and Mg(OH)$_2$.

6. The process of claim 1 wherein the partially hydrogenated aromatic hydrocarbon is a member of the group consisting of a partially hydrogenated benzene, a partially hydrogenated biphenyl, a partially hydrogenated toluene, a partially hydrogenated naphthalene, and alkylated hydrocarbon derivatives thereof.

7. The process of claim 1 wherein the aromatic hydrocarbon is selected from the group consisting of benzene, biphenyl, toluene, xylene, ethylbenzene, and naphthalene.

8. The process of claim 1 wherein the aromatic hydrocarbon is biphenyl.

9. The process of claim 1 wherein the aromatic hydrocarbon is biphenyl and the partially hydrogenated aromatic hydrocarbon is phenyl cyclohexane.

10. The process of claim 1 wherein the partially hydrogenated aromatic hydrocarbon is from 2 to 5% of the total weight of reactants.

11. The process of claim 1 wherein the partial hydrogen pressure under reaction conditions is at least 30% of the total reaction pressure.

12. The process of claim 1 wherein the active carbon catalyst is from 1 to 4% of the weight of the reactants.

* * * * *